(No Model.)
R. LAVERY.
DIFFERENTIAL GEARING FOR HOISTING AND OTHER PURPOSES.
No. 286,206. Patented Oct. 9, 1883.
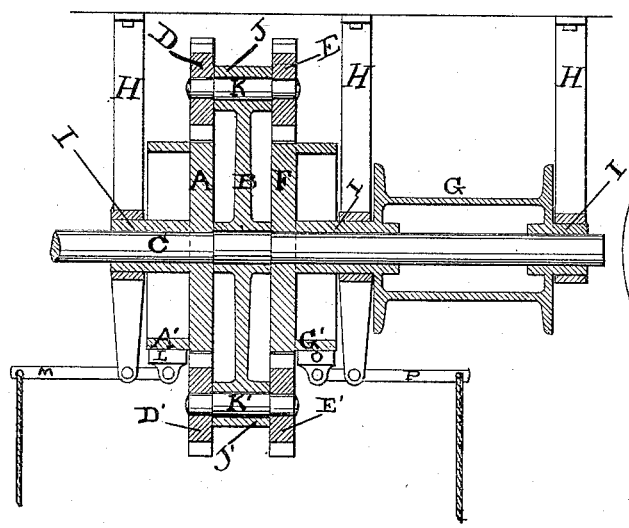
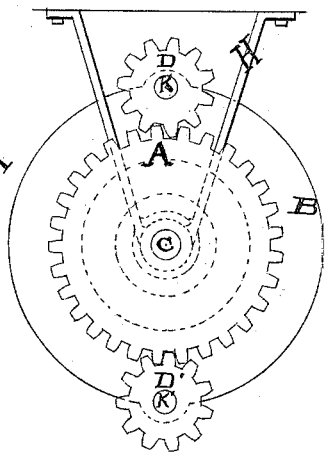
Witnesses
Inventor
Richard Lavery

UNITED STATES PATENT OFFICE.

RICHARD LAVERY, OF BOSTON, MASSACHUSETTS.

DIFFERENTIAL GEARING FOR HOISTING AND OTHER PURPOSES.

SPECIFICATION forming part of Letters Patent No. 286,206, dated October 9, 1883.

Application filed July 12, 1883. (No model.)

*To all whom it may concern:*

Be it known that I, RICHARD LAVERY, a citizen of the United States, residing at Boston, in the county of Suffolk and State of Massachusetts, have invented a new and useful Improvement in Differential Gearing for Hoisting and other Purposes, of which the following is a specification.

My invention relates to a form of differential gearing wherein a fixed or non-revolving gear acts as a base or fulcrum to give motion to, and likewise to pawl or hold, the load or strain.

The objects of this invention are to raise and lower the load at the will of the operator, without reversing or stopping the prime mover, and to that end, by means of a brake, ratchet, pin, or any other suitable detaching device, the gear is allowed to revolve when lowering, and is held fixed when hoisting the load.

Referring to the accompanying drawings, which form a part of this specification, Figure 1 is a vertical section on center line of machine, with external toothed gearing; Fig. 2, end view on face of gearing.

A, Fig. 1, is a central external toothed revolving gear, with brake-wheel A' and journal I, attached or made as a whole, mounted and free to revolve upon a central shaft, C, and also held free to revolve in the hangers H H.

B is a wheel mounted upon and secured to the shaft C, with bearings J J', through which pass shafts K K', upon which are mounted and fixed the pinions D D' and E E', gearing into the central gear, A, and also into a second central gear, F.

G is a hoisting-drum, with brake-wheel G' attached, secured to gear F and mounted upon the shaft C, and likewise upon the hangers H H, through journals I I; or the gear F, drum G, brake-wheel G', and journal I can be made as a whole.

L is a brake-strap operated by the lever M.

O is a brake band or strap operated by the lever P.

The operation is as follows: A revolving motion being given to shaft C, the pinions D D' E E' will roll upon the periphery and gear into the central external toothed gears, A F, and by reason of the pinions D D' having a less number of teeth than the pinions E E' a differential motion will be imparted to the central gears, A F, according as the brakes are applied to the wheels A' or G'. The same results will be obtained if the central gears, A F, are of different diameters and number of teeth, or if all the gears are unequal in diameters and number of teeth. For example, in hoisting the load, the brake L having been applied, the gear A is arrested in its rotary motion, the pinions D D', gearing into the gear A and revolving upon the same, will be governed in the number of their revolutions by the number of teeth there may be in the gear A, and, being secured to the pinions E E', will impart to the same an equal number of revolutions. The pinions E E', having a greater number of teeth than the pinions D D', will revolve the gear F and drum G, to which the load is attached, a distance equal to the pitch and number of teeth so varying, and thereby hoist or move the load. When it is desirable to stop and to hold the load, the brake A' is disengaged, the brake G' at the same time being applied. By means of the brake G', the load can be lowered with ease and safety.

I am aware that differential gearing with a fixed central gear, in combination with a pinion or pinions and a second central revolving gear, has been used, for which I have received Letters Patent. I therefore do not intend to claim this construction; but

What I claim as my invention, and desire to secure by Letters Patent, is—

1. A central gear, A, in combination with a locking and unlocking device, whereby the gear can be made revolving or non-revolving at will, substantially as and for the purpose set forth and specified.

2. The brakes L O, in combination with the brake-wheels A' G', the gears A F, the wheel B, the pinions D D' E E', the drum G, shaft C, and hangers H H, substantially as shown, and for the purpose specified.

3. The combination of the external toothed gears A F with the pinions D D' E E', shafts K K', bearings J J', wheel B, shaft C, hangers H H H, journals I I I, drum G, brake-wheels A' G', brakes L O, and levers M P, substantially as and for the purpose set forth and specified.

In testimony whereof I have signed my name to this specification in the presence of two subscribing witnesses.

RICHARD LAVERY.

Witnesses:
J. H. ADAMS,
E. PLANTA.